United States Patent [19]

Anderson et al.

[11] 3,968,634
[45] July 13, 1976

[54] STACK-FORMING MACHINE HAVING UNIFORM LOADING CONTROL

[75] Inventors: John Dale Anderson, Canton; Bruce Leo Lutz, Hesston; Harold Keith Garrison, Newton, all of Kans.

[73] Assignee: Hesston Corporation, Hesston, Kans.

[22] Filed: Feb. 18, 1975

[21] Appl. No.: 550,177

[52] U.S. Cl. ................................. 56/344; 56/16.6; 302/61
[51] Int. Cl.² ......................................... A01D 87/10
[58] Field of Search ........................... 56/344–360, 56/341, 343, 16.4, 16.6; 302/60, 61; 100/66, 215; 214/519, 522

[56] References Cited
UNITED STATES PATENTS

| | | | |
|---|---|---|---|
| 2,019,926 | 11/1935 | Noble | 302/60 X |
| 2,845,661 | 8/1958 | Svende et al. | 302/61 X |
| 3,698,576 | 10/1972 | Gillette | 302/60 X |
| 3,845,608 | 11/1974 | Lueshen | 56/344 X |

*Primary Examiner*—Hugh R. Chamblee
*Assistant Examiner*—J.N. Eskovitz
*Attorney, Agent, or Firm*—Schmidt, Johnson, Hovey & Williams

[57] ABSTRACT

The discharge spout of the pickup in a stack-forming machine is provided with baffle structure inside the spout and adjacent the discharge opening that oscillates horizontally and continuously through a stream of crops being projected into the forming body of the machine in order to break up wads and clumps of matter in the stream and to evenly distribute the stream from side-to-side within the body. One embodiment utilizes a single, centrally disposed fin as the baffle structure, while another employs a pair of such fins angled acutely with respect to one another, centered in the spout and controlled to preclude swinging of each fin inwardly beyond a position parallel to the direction of crop flow.

18 Claims, 4 Drawing Figures

STACK-FORMING MACHINE HAVING UNIFORM LOADING CONTROL

This invention relates to a stack-forming machine of the type shown, for example, in U.S. Pat. Nos. 3,556,327; 3,691,741; and 3,732,672 owned by the assignee of this invention. More particularly, it relates to improvements in the quality of stacks produced by such machines, and in this instance, involves changes in the loading process during which crop material is introduced into the forming chamber of the machine prior to compaction.

Since weathering and handling characteristics of formed stacks are related to their structural stability, it is important to consistently produce high-quality, structurally stable stacks. However, under certain adverse conditions, such as high moisture, improper operator technique or improperly prepared windrows, and when stacking certain coastal grasses, structurally stable stacks may be quite difficult to produce, their tendencies instead being to lean to one side, to be misshaped, and/or to have a top which can slide easily from the base of the stack.

The problem of top separation is known to be caused by a buildup of crop peaks within the base of the stack as it is being formed, and these peaks produce areas of transverse instability whereby the stack top will slide laterally away from the base if the center of gravity of the top is not directly over the peak. Generally speaking, the problem is caused by channeling the crop more to one part of the forming chamber during loading rather than distributing it evenly side-to-side.

The leaning stacks are generally caused by a stack having its center of gravity disposed to one side of its central axis. This condition is caused by an unequal, side-to-side distribution of crop material while it is being loaded, as well as by the loading of wads or conglomerates of material to one side of the chamber but not the other.

A poorly shaped stack is generally caused by unequal settling of the stack whereby the original configuration of the stack is lost as the stack settles from weather exposure. One cause of this unequal settling is due to the presence of areas of unequal density throughout the stack, such as presented by wads, clumps and conglomerates of material. This condition is particularly true in stacks formed of coastal hay grasses.

Stack instability is a highly undesirable condition because it strongly affects the weather-shedding capabilities of the afflicted stacks as well as their ability to resist breakup when moved from place-to-place. In this respect top separation causes the interior of the stack to be exposed to weathering as well as resulting in loss of some fodder which formed the top of the stack. The leaning stack presents an unstable structure against rain and high winds; these stacks usually collapse when moved and generally weather very poorly. The incorrectly shaped stack does not weather well because its smooth, depression-free crown has been destroyed, presenting pockets in which moisture can collect and seep into the interior of the stack.

Accordingly, one important object of the present invention is to provide a stack-forming machine which will produce high quality stacks under adverse conditions.

Another important object of the present invention is to provide means by which the undesirable stack characteristics above referred to may be relatively easily eliminated or substantially minimized by the exercise of special control over the crop stream as it is fed into the stack-forming chamber of the machine.

Pursuant to the foregoing object, it is an important aim of the invention to provide oscillating baffle structure within the discharge spout of the pickup of the stack-forming machine adjacent the outlet thereof for breaking up clumps or wads of material in the crop stream and for uniformly directing the stream from side-to-side within the stack-forming chamber.

An additional important object of the present invention is the provision of a single upright fin as the oscillatory baffle structure.

A further important object is the provision of a dual fin arrangement as the baffle structure wherein the two fins diverge from one another in the direction of crop flow and each fin is prevented in its stroke from swinging inwardly beyond a position parallel with the crop flow.

Yet another important object of the present invention is to provide a mechanism for accomplishing the foregoing objects which can be easily installed on existing stack-forming machines.

Figure 1:
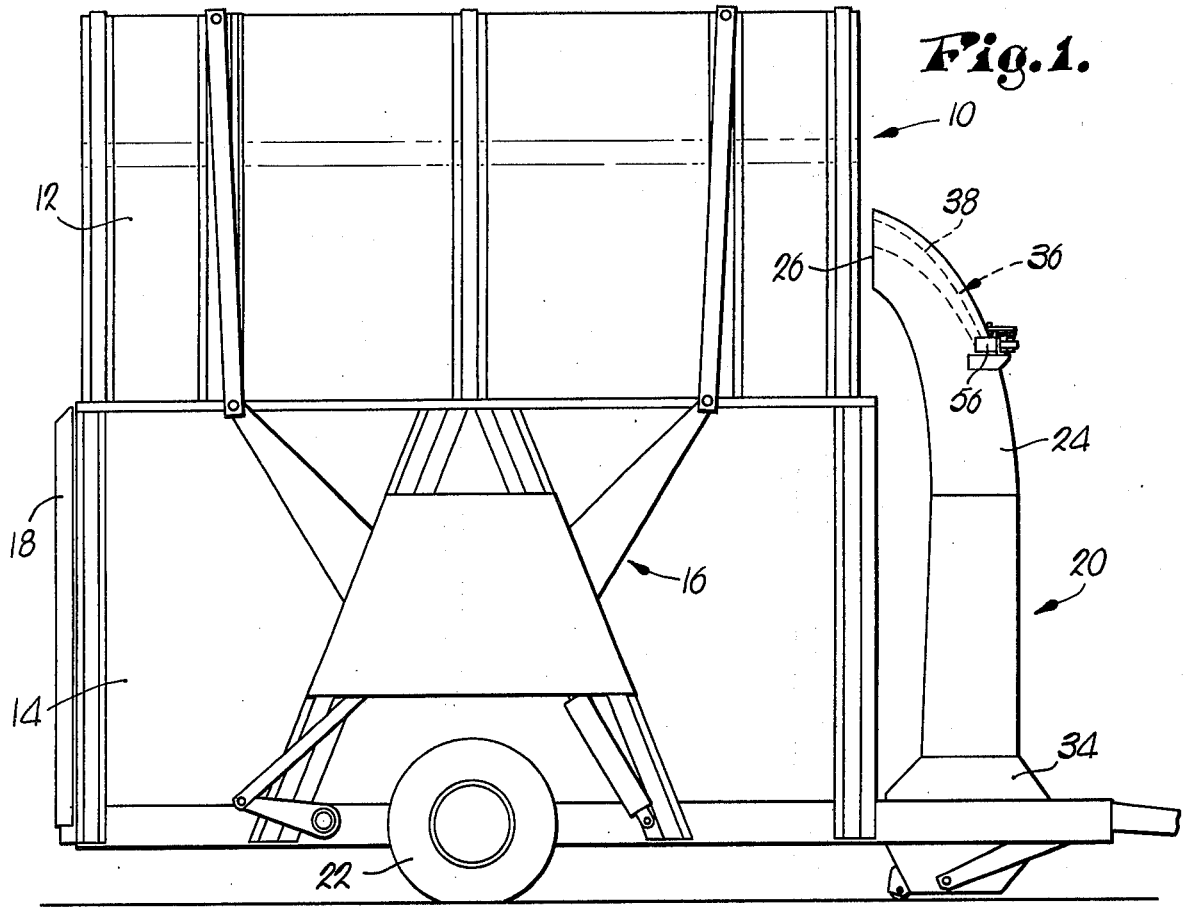
FIG. 1 is a side elevational view of a stack-forming machine provided with a loading control embodying the principles of the present invention.
Figure 2:
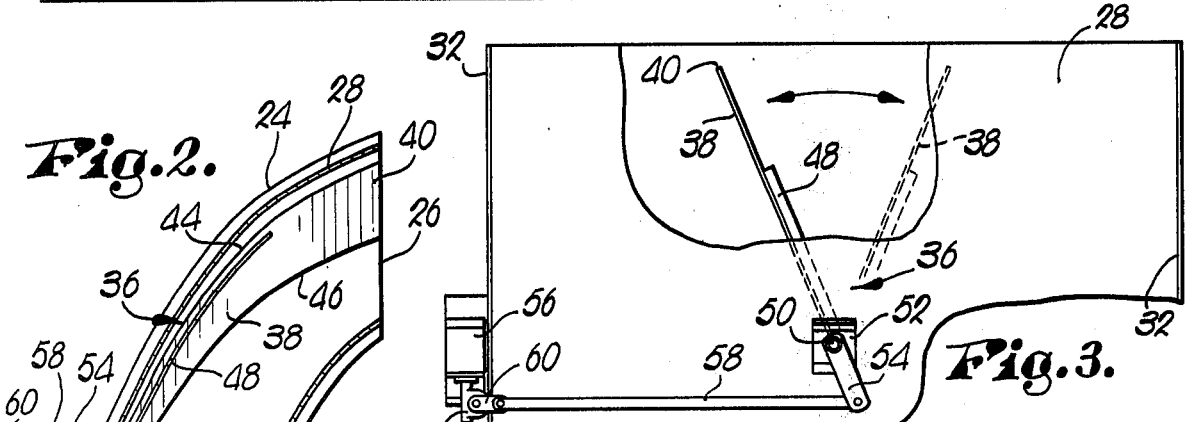
FIG. 2 is an enlarged, fragmentary, vertical sectional view of the discharge spout and oscillating baffle structure that provides the desired loading control.
Figure 3:
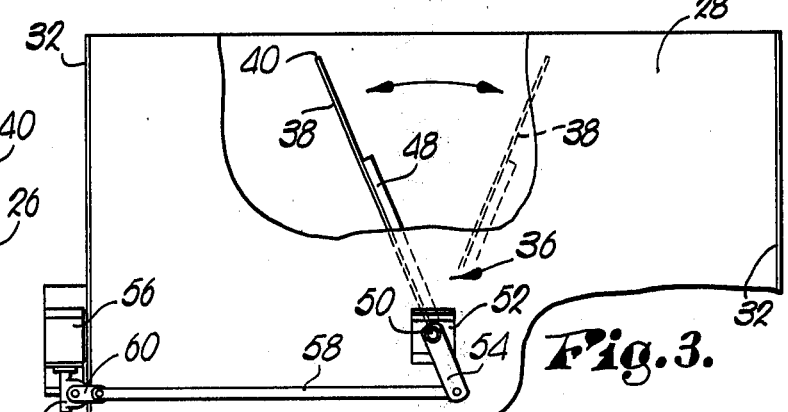
FIG. 3 is a fragmentary, top plan view of the discharge spout and baffle structure, the front wall of the spout being partially broken away and alternate extreme positions of the baffle structure being indicated.

Referring initially to FIGS. 1–3, a stack-forming machine has a collapsible hollow body 10 defined by a pair of vertically telescoping upper and lower sections 12 and 14 respectively, the upper section 12 forming a press that is reciprocated toward and away from lower section 14 by operating mechanism 16 for periodically compacting a crop which has collected in body 10. An endgate 18 on lower section 14 may be opened for unloading of a compacted stack from body 10 by mover mechanism (not shown) within body 10.

The machine also includes pickup apparatus 20 that is operable to lift a crop from the field as the machine is advanced on ground wheels 22 and to project the crop upwardly through spout 24 and rearwardly from outlet 26 thereof into body 10 when press section 12 is raised as in FIG. 1. Spout 24 is, of course, tubular having spaced-apart front and rear walls 28 and 30 respectively, as well as two opposed, spaced-apart sidewalls 32, all of which lead downwardly from outlet 26 to the rotor housing 34 of pickup 20.

Baffle structure, generally designated by the numeral 36, is centered within spout 24 along its longitudinal axis and near outlet 26. In the embodiment of FIGS. 1–3, structure 36 includes a single, arcuate, elongate, tapered fin 38 having a free end 40 at the outlet 26, a smaller pivoted end 42 spaced from the outlet 26 along front wall 28, and converging, arcuate, upper and lower edges 44 and 46 respectively extending between ends 40 and 42. An elongate reinforcing rib 48 extends along the longitudinal axis of fin 38. Reduced end 42 is mounted on front wall 28 for swinging movement about an upright axis defined by a pin 50 fixed to end 42 and rotatably supported by bracket 52. A lever 54 extends radially from pin 50 and is operably coupled with a driving motor 56 through a long link 58, a short crank 60, and a right angle gear box 62. This arrangement is operable to continuously oscillate fin 38 between the two extreme positions illustrated in FIG. 3.

Figure 4:
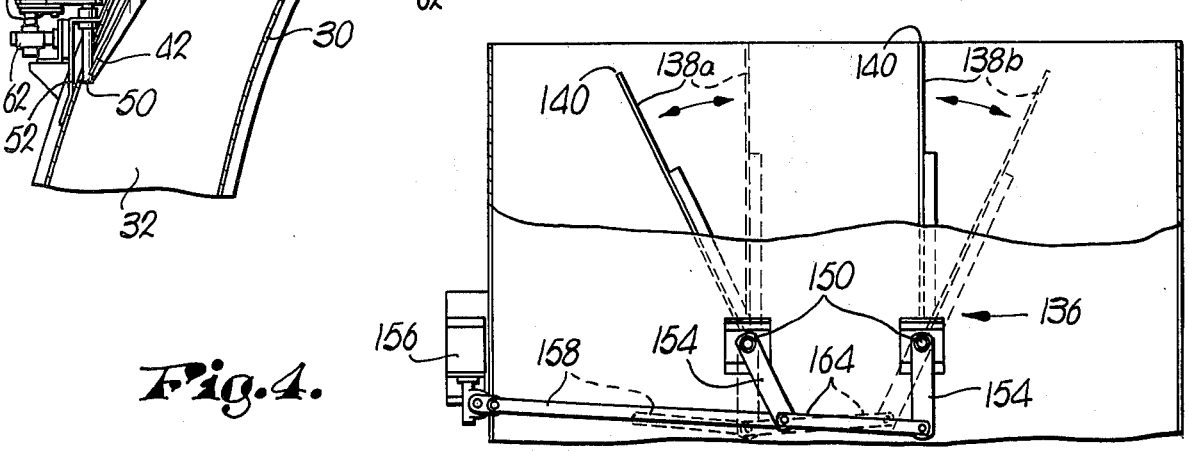
FIG. 4 is a fragmentary, top plan view of the discharge spout similar to FIG. 3 showing a second embodiment of the present invention and its alternate extreme positions.

A second embodiment of the present invention is illustrated in FIG. 4 wherein baffle structure 136 has a pair of laterally spaced-apart fins 138a and 138b identical in construction to fin 38 of FIGS. 1–3. Fins 138a and 138b are centered with respect to the longitudinal axis of spout 24, and their levers 154 are pivotally interconnected by a short link 164 that holds fins 138a and 138b in an acutely diverging relationship as their free ends 140 are approached. The short link 164 and long link 158 cooperate to swing fins 138a, 138b in unison and in the same direction when motor 156 is actuated, and, moreover, they cooperate to limit the swinging of each fin 138 between a first position parallel with the longitudinal axis of spout 24 (shown in solid lines by fin 138b and in phantom by fin 138a) and a second position angled outwardly from such axis (shown in solid lines by fin 138a and in phantom by fin 138b).

In operation, the stack-forming machine is pulled along a previously prepared crop windrow and the material is lifted by pickup apparatus 20 and projected rearwardly through spout 24 into body 10. As the crop collects in body 10, press section 12 is periodically actuated to compact the collected crop until a stack of the desired size has been produced, whereupon the endgate 18 is opened and the completed crop stack is ejected from body 10.

Referring first to the embodiment of FIGS. 1–3, fin 38 is continuously oscillated through the crop stream in spout 24 during loading, such oscillation being approximately 60 cycles per minute. The oblique position of fin 38 at various points in its cycle presents an obstacle upon which projected crop material impinges and is deflected from its normal path of travel. This impingement aids in breaking up any wads or conglomerates of material which may be present in the projected stream so that a stream substantially devoid of high density zones enters body 10.

Further, the elongate planar surface of fin 38 operates to deflect material to a direction parallel to the position of the fin and its constantly changing position serves to continuously redirect the projected crop and broadcast it evenly side-to-side of body 10. Additionally, the lower arcuate edge 46 presents a knife-like structure within the crop stream which aids in cutting and disintegrating clumps of projected crop.

In many respects then, the oscillating fin 38 functions as a blender and distributor within the crop stream to produce a substantially uniform average flow distribution across spout 24. Accordingly, stacks prepared by the machine will contain minimal density variations from side-to-side and will contain fewer conglomerates of crop material, hence avoiding uneven settling and the production of a stack having irregular configuration.

The operation of the dual fins 138a and 138b of the second embodiment of the present invention is very similar to the operation of the first embodiment described above, although it also differs in certain respects. Specifically, the centered, spaced-apart relationship of the fins 138a and 138b, together with the limited path of travel through which each can move is significant because this allows a central portion of the crop stream, between fins 138a and 138b, to be projected into body 12 without any deflection. Hence, sufficient material is always projected centrally into body 10 to assure formation of a properly crowned, water-shedding top for the stack.

At the same time, the oscillating fins 138a and 138b present oblique obstacles in the sides of the crop flow which serve to deflect projected crop and to disintegrate crop conglomerates in the same manner as fin 38 of the first embodiment.

From the foregoing, it should be apparent that both the single fin and dual fin versions of the present invention are important contributions to the present state of the stack-forming art and represent relatively non-complex, low-cost solutions to stack-forming problems hereinabove set forth. Both versions serve to break apart clumps or conglomerates of crop material as it is projected through spout 24 such that the material actually issuing from spout outlet 26 is substantially free of such high density wads of material. Hence, the resulting stack will be equally as free from such undesirable zones of high crop density to the end that unequal settling and deformation of the stack as it weathers is avoided.

Further, both versions are operable, through their continuously oscillating natures, to spread the projected crop uniformly from side-to-side of the body 10 as the latter is being loaded, hence assuring that the center of gravity of the finished stack will be located substantially centrally thereof to avoid any tendency for the stack to lean precariously to one side. Still further, the single fin 38 and the dual fins 138a and 138b serve to prevent the formation of interior peaks in the stack which would otherwise encourage the top layers of the stack to slide off during movement from field to feedlot, or even during periods of non-movement when rain and strong winds buffet the stack. On the other hand, under certain conditions, the dual fin arrangement is to be preferred over the single fin version in view of the special orientation of fins 138a and 138b that assures the accumulation of sufficient crop material in the center of the stack to produce the properly crowned top.

It should also be readily apparent that both embodiments of the present invention represent structure that can be easily added to existing stack-forming machines, requiring only minor adaptation thereof. In the first embodiment interface with existing machines can be accomplished with changes at two points only, i.e., mounting for the pin 50 and mounting for the motor 56. In the second embodiment interface can be accomplished in the same manner, but with one additional mounting point for an extra pivot pin 150.

Having thus described the invention, what is claimed as new and desired to be secured by Letters Patent is:

1. In a stack-forming machine having a hollow body provided with a reciprocable press and apparatus for picking up a crop from the ground and projecting it into the body for compaction, said apparatus including an elongate spout conducting a stream of the projected crop and having a discharge outlet oriented to direct the stream into the body, the improvement comprising:
   elongate baffle structure;

means shiftably mounting said structure within said spout near said outlet for movement transversely of the spout along a predetermined path of travel, said mounting means disposing each end of said structure within said stream; and mechanism operably coupled with said structure for continuously oscillating the latter along said path and through said stream to reduce conglomerates of projected crop and to evenly distribute the stream from side-to-side within said body.

2. In a stack-forming machine as claimed in claim 1, wherein said mounting means supports said structure for swinging movement along said path.

3. In a stack-forming machine as claimed in claim 1, wherein said structure is laterally centered with respect to the longitudinal axis of said spout.

4. In a stack-forming machine as claimed in claim 1, wherein said spout has a normally front and a normally back wall, said structure extending along said front wall spaced from said back wall.

5. In a stack-forming machine as claimed in claim 1, wherein said structure comprises a single, upright fin.

6. In a stack-forming machine as claimed in claim 5, wherein said mounting means supports said fin for swinging movement about a vertical axis.

7. In a stack-forming machine as claimed in claim 6, wherein said axis of swinging movement is located at one end of said fin.

8. In a stack-forming machine as claimed in claim 7, wherein said one end is spaced from said outlet, the opposite end being proximal to said outlet.

9. In a stack-forming machine as claimed in claim 8, wherein said fin is elongate, having a pair of opposed, arcuate, longitudinal edges extending between said ends, said edges converging as said one end is approached.

10. In a stack-forming machine as claimed in claim 1, wherein said structure comprises a pair of laterally spaced-apart, upright fins.

11. In a stack-forming machine as claimed in claim 10, wherein said mounting means supports said fins for swinging movement about a pair of corresponding, spaced-apart axes.

12. In a stack-forming machine as claimed in claim 11, wherein the axis of swinging movement of each fin is located at one end thereof.

13. In a stack-forming machine as claimed in claim 12, wherein said one end of each fin is spaced from said outlet, the opposite end of each fin being proximal to said outlet.

14. In a stack-forming machine as claimed in claim 13, wherein each fin is elongate, having a pair of opposed, arcuate, longitudinal edges extending between said ends, said edges converging as said one end is approached.

15. In a stack-forming machine as claimed in claim 13, wherein said fins converge acutely toward one another as said mounting means is approached.

16. In a stack-forming machine as claimed in claim 15, wherein said mechanism includes means for limiting each of said fins respectively to movement between a first position parallel to the longitudinal axis of the spout and a second position angled outwardly away from said longitudinal axis.

17. In a stack-forming machine as claimed in claim 5, wherein said fin is elongate, having a pair of opposed, arcuate, longitudinal edges extending between said ends, said ends converging as said one end is approached.

18. In a stack-forming machine as claimed in claim 10, wherein each fin is elongate, having a pair of opposed, arcuate, longitudinal edges extending between said ends, said edges converging as said one end is approached.

* * * * *